United States Patent

Todd et al.

[11] 4,056,107
[45] Nov. 1, 1977

[54] CROP RESIDUE DEFLECTOR MEANS

[75] Inventors: Robert R. Todd, Leola; Edward W. Rowland-Hill, Lancaster, both of Pa.

[73] Assignee: Sperry Rand Corporation, New Holland, Pa.

[21] Appl. No.: 679,956

[22] Filed: Apr. 26, 1976

[51] Int. Cl.² .................................................. A01F 7/06
[52] U.S. Cl. .................................. 130/27 R; 241/80; 241/186.3; 130/27 T
[58] Field of Search ............ 56/14.6; 130/27 R, 27 T; 241/80, 68, 69–79.3, 47, 222, 186.1

[56] References Cited

U.S. PATENT DOCUMENTS

| | | | |
|---|---|---|---|
| 3,350,017 | 10/1967 | Howell et al. | 239/660 |
| 3,521,687 | 7/1970 | Gaeddert | 146/117 |
| 3,670,739 | 6/1972 | Rowland-Hill | 130/27 T |

*Primary Examiner*—Russell R. Kinsey
*Attorney, Agent, or Firm*—Frank A. Seemar; John B. Mitchell; Michael R. Swartz

[57] ABSTRACT

A deflector panel is pivotally mounted within the straw hood of a combine and is disposable between a first position wherein residue material emanating from the combine is deflected into a straw chopper and a second position wherein the emanating material is deflected through the residue outlet of the straw hood, forwardly of the straw chopper, and discharged onto the ground.

8 Claims, 3 Drawing Figures

CROP RESIDUE DEFLECTOR MEANS

BACKGROUND OF THE INVENTION

The present invention relates to combine harvesters (hereinafter referred to as "combines") and more particularly to a deflector which is operable to direct the flow of crop residue material emanating through the discharge hood of the combine either into a crop residue treating device or onto the ground.

It is common practice to attach a crop residue treating device, such as, a straw chopper, a straw spreader or similar device, to the straw discharge hood of a combine for treating the residue material prior to discharge of the same over the ground. Some operators prefer to use straw choppers which chop the straw into small pieces, whereas others use straw spreaders that scatter the straw in a wide pattern behind the combine. Generally, these treating devices are used to prevent later tillage problems. However, in some circumstances, straw choppers and spreaders or like devices are not required or even desired, such as is the case where the operator desires to bale or otherwise collect the residue straw material. In such a situation, it is preferable that the straw be discharged directly on the ground into a windrow.

Thus, it was the customary practice for the operator in the past to remove the straw chopper or other attachment from the combine when he wanted to windrow and collect the straw and to attach the chopper when he wanted to chop the straw. This operation generally required more than one man in that such attachments are heavy and bulky.

Various attempts have been made heretofore to eliminate this attachment/detachment operation by mounting the straw chopper (treating device) to the combine in such manner that it could be moved between an "in-use" operative position and an "out-of-use" inoperative position without detaching the chopper from the combine. Such attempts are described and illustrated in U.S. Pat. Nos. 3,690,359 and 3,712,309.

These prior art attempts to solve the problems are cumbersome, complicated in structure and costly, yet alone, being an inconvenience to the operator which is both time consuming and tiring.

SUMMARY OF THE INVENTION

Accordingly, it is the principal object of the present invention to provide an improvement in a combine harvester in which the aforementioned problems of the prior art have been overcome and which is simple and inexpensive in structure, reliable in operation and convenient for the operator to use.

In furtherance thereof, the present invention sets forth in a combine having a crop residue treating means, such as a straw chopper or the like, a deflector means for directing the flow of crop residue material emanating from the combine into the residue treating means or through the residue outlet thereof and onto the ground, by-passing the treating means.

More particularly, the deflector means is mounted within the discharge hood of the combine, above the straw chopper, and is disposable between a first position, relative to the path of travel of the emanating residue material, to allow the residue material to flow into the straw chopper and a second position wherein the flow of emanating residue material is blocked from the straw chopper and is directed through the residue outlet onto the ground, forwardly of the chopper.

Preferably, the deflector means includes a rigid panel pivotally mounted at one end to the top of the discharge hood and extending downwardly toward the straw chopper. The panel is inclined upwardly and forwardly in its first position to deflect the flow of emanating residue material into the straw chopper and is movable to a second position, forwardly of the first position, to deflect the emanating residue material through the discharge outlet, forwardly of the straw chopper, and onto the ground.

The invention further includes fastening means for retaining the deflector panel in its desired first and second positions.

The foregoing and other objects, features and advantages of the invention will appear more fully hereinafter from a consideration of the detailed description which follows, in conjunction with the accompanying sheets of drawings wherein one principle embodiment of the invention is illustrated by way of example. It is to be expressly understood, however, that the drawings are for illustrative purposes and are not to be construed as defining the limits of the invention.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the combine facing in a direction of forward travel. Also, in the following description, it is to be understood that such terms as "forward," "rearward," "left," "upwardly," etc., are words of convenience and are not to be construed as limiting terms.

IN GENERAL

Figure 1:
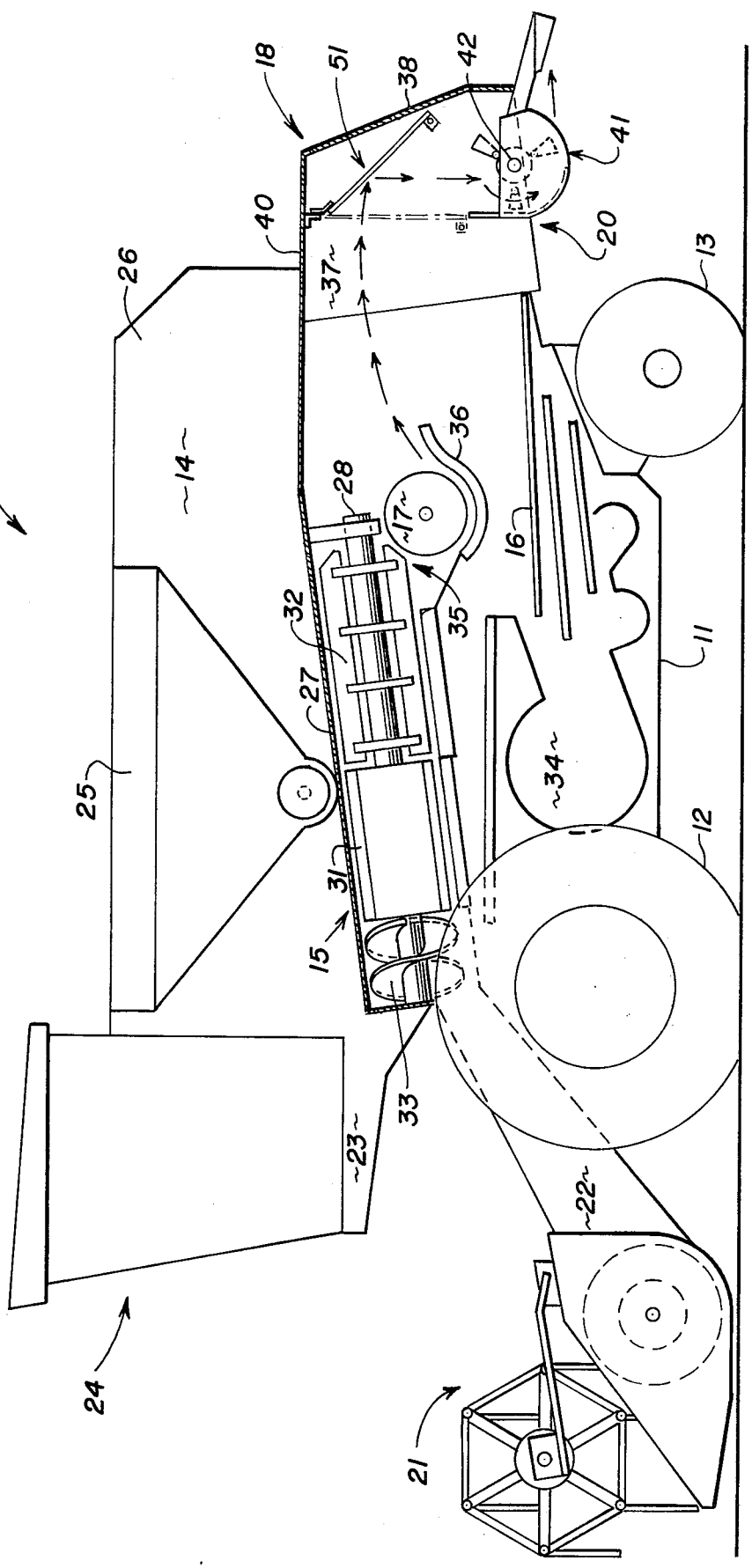
FIG. 1 is a side elevational view of a combine embodying the improvement of the present invention with the side and casing of the combine removed to illustrate the operational components thereof and with arrows indicating the flow of residue material emanating from the combine rearwardly toward the improvement being in the form of a deflector panel in the straw hood which deflects the material downwardly into the straw chopper when it is in its first position, as represented solid lines form, and downwardly through the discharge outlet, forwardly of the chopper, when in its second position, as represented in broken line form.

Referring now to the drawings, and particularly to FIG. 1, there is shown an axial flow type combine, being indicated generally by the numeral 10, which incorporates the preferred embodiment of the improvement provided by the present invention. While the combine illustrated herein is of the axial-flow self-propelled type, it will be readily apparent to those skilled in the combine harvester art that the principles of the present invention are equally applicable to a conventional combine or a pull-type model as well as to other similar devices.

The combine described herein, generally has a supporting frame 11 mounted on a pair of large front drive wheels 12 and a pair of smaller rear steering wheels 13 (only one wheel of each pair being shown). A housing 14 on the frame 11 encloses and supports, preferably, two axial flow threshing and separating units 15, grain handling and cleaning mechanism 16 and a rotary discharge beater 17. The housing 14 extends rearwardly and has a straw hood 18 enclosing the back of the housing and providing a large fore-and-aft space with a downwardly facing opening or outlet 20 through which the crop residue material is dicharged onto the ground.

While the term grain and straw will be used throughout this application for convenience sake, it should be understood that these terms are not intended to be limiting. The term "grain" as used herein refers to the part of the crop material that may be threshed and separated from the residue or discardable part of the crop material (straw, cobs, chaff, etc.) which will be referred to hereinafter as straw.

On the front of the combine is the header 21 and the crop elevator 22. The header 21 cuts the crop material in front of the combine 10 in generally a swath having a width greater than the distance between the front wheels 12 and delivers a mat of the cut crop material rearwardly to the crop elevator 22 which further conveys the material upwardly and rearwardly to the forward ends of the threshing and separating units 15.

Extending forwardly from the housing 14 and over the crop elevator 22 is the operator's platform 23 and the cab 24. Rearwardly from the cab 24 and supported on the housing 14 is a grain tank 25 for temporarily storing the threshed grain and an engine 26 provided with suitable drive means (not shown) to drive the combine 10 and to operate the header 21, crop elevator 22, axial units 15, rotary discharge 17, grain handling and cleaning mechanism 16 and other power operated components.

The two aial flow threshing and separating units 15 comprise two generally cylindrical casings 27 in side-by-side relation with respective rotatably-mounted rotors 28 extending therethrough. Each of the rotors 28 have forward threshing bars 31 and rearward separating bars 32. The forward end of each axial unit 15 comprises an auger 33 which receives the incoming crop material from the elevator 22 and transports the same rearwardly to the bars 31 which, in turn, move the material rearwardly and circumferentially through the casing 27, and to the bars 32, subjecting the cop material to a continuous threshing and separating action. Grain and other material separated from the straw during the threshing and separating action falls or passes through concaves and grates, not shown, positioned at the bottom of the casing 27 and onto the grain cleaning and handling mechanism 16 which includes means to separate clean grain and means to separate unthreshed material (known in the art as tailings) from the remainder of the material received in the cleaning mechanism 16. A rotary fan 34 is provided to blow the chaff out the rear of the machine as the grain falls through the sieves of the cleaning mechanism 16. The cleaned grain is then elevated into the grain tank 25 by an elevator, not shown, and the trailings are elevated by an elevator, not shown, and delivered to the inlet end of the threshing and separating units 15 where it joins the unthreshed grain being fed into the units from the crop elevator to repeat the threshing and separating cycle.

The threshed crop material or straw passes through the opening 35 provided at the rear of the axial units 15 and is delivered downwardly and rearwardly to the discharge beater assembly 17, at which time the direction of travel of the straw (i.e. circumferential through the threshing and separating units) is changed to a linear motion. The discharge beater propels the straw residue material rearwardly, along the curved guide member 36 from which it emanates rearwardly through the fore-and-aft space within the housing straw hood 18, as indicated by the arrows in FIG. 1.

STRAW CHOPPER

The downwardly facing straw hood 18, which defines the discharge outlet 20, is comprised of a pair of spaced-apart longitudinally extending sidewalls 37 joined by a rear end portion 38 and a top wall portion 40. A residue material treating means in the form of a conventional straw chopper 41 is mounted in the vicinity of the residue outlet 20 of the straw hood 18. More specifically, the straw chopper 41 is positioned within the rearmost portion of the outlet 20 and comprises a rotor shaft 42 transversely extending and rotatably supported in bearing (not shown) between the lower edge portion of the sidewalls 37. The shaft 42 extends through the right sidewall 37 and has a sheave 43, best seen in FIG. 3, for connection to a belt and pulley drive (not shown) of the engine 26 whereby the rotor is rotatably driven in a counter-clockwise direction as viewed in FIG. 2.

Circumferentially and axially positioned on the rotor shaft 42 are knife supports 44. Knives 45 are pivotally attached to these supports 44 for extending generally radially outwardly on rotation to chop residue crop material in cooperation with a curved member 46. The curved member 46 is forwardly of the rotor 42 and has an upper forward planar part and a rearward downwardly curved part conforming generally to the cylindrical peripheral zone described by rotation of the knives 45. An inlet opening 47 extends across the top of the curved member 46 for receiving material to be chopped and a lower discharge opening 48 to discharge the chopped material from the combine. A series of vanes 50 extend rearwardly from the chopper 41 to scatter the chopped residue material rearwardly of the combine 10. The straw chopper 41, being conventional and forming no part of this invention, has only been described briefly and is similar to the one described in U.S. Pat. No. 3,670,739.

RESIDUE MATERIAL DEFLECTOR MEANS

The rearwardly emanating crop residue material may be directed to the above-described straw chopper 41 by the improvement of the present invention which takes the form of deflector means, generally indicated by the numeral 51. However, the primary purpose of the deflector means 51 is to direct the flow of the residue material, emanating from the axial units 15 and the discharge beater 10, through the residue outlet 20 of the straw hood 18 as shown by the arrows of FIGS. 1 and 2.

The deflector means 51 includes a deflector panel 52, preferably in the form of a rigid metal sheet, pivotably mounted within the straw hood 18 and disposable in the flow path of the emanating residue material. The panel 52 is pivotally mounted to the top wall 40 of the straw hood 18, forwardly from the rear wall 38 and upwardly from the straw chopper 41. The upper end of the panel 52 is attached to one edge of a narrow rubber strip 53 whose other edge is attached to the vertical leg of a transversely extending angle iron 54 secured to the inner surface of the top wall 40 of the straw hood 18. As viewed in FIG. 3, the panel extends between the sidewalls 37 and downwardly from the top wall 40 toward the residue outlet 20.

Figure 2:
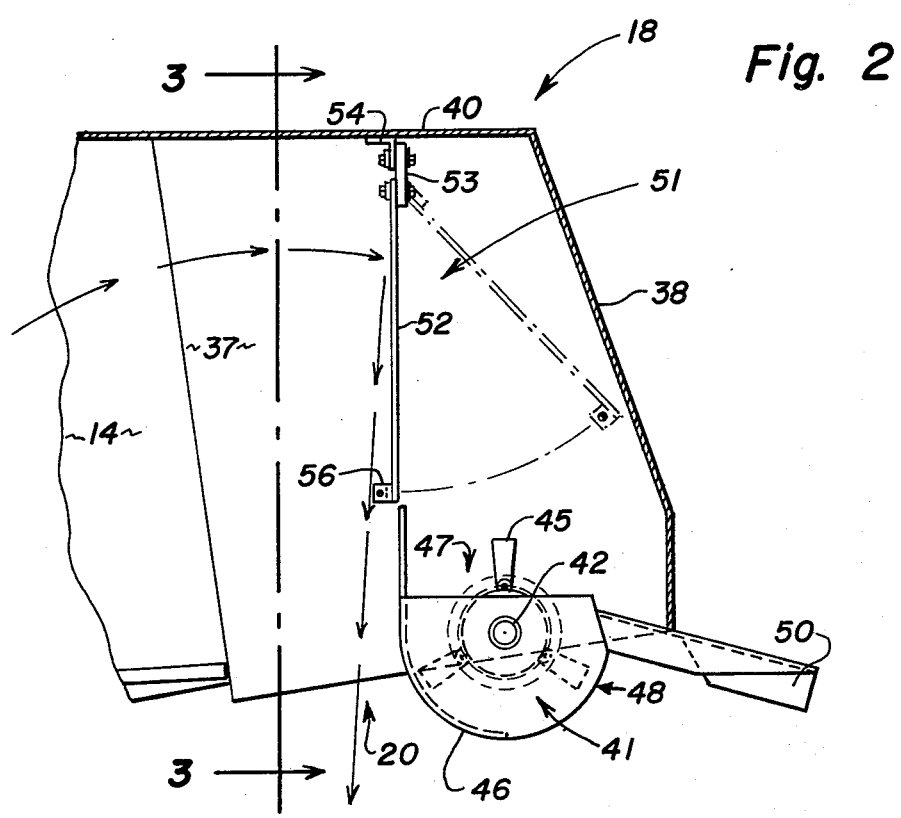
FIG. 2 is an enlarged side elevational view of the rear end of the combine of FIG. 1 with the left side of the straw discharge hood removed to more clearly show the novel deflector panel being depicted in broken line form in its first position and solid line form in its second position.
Figure 3:
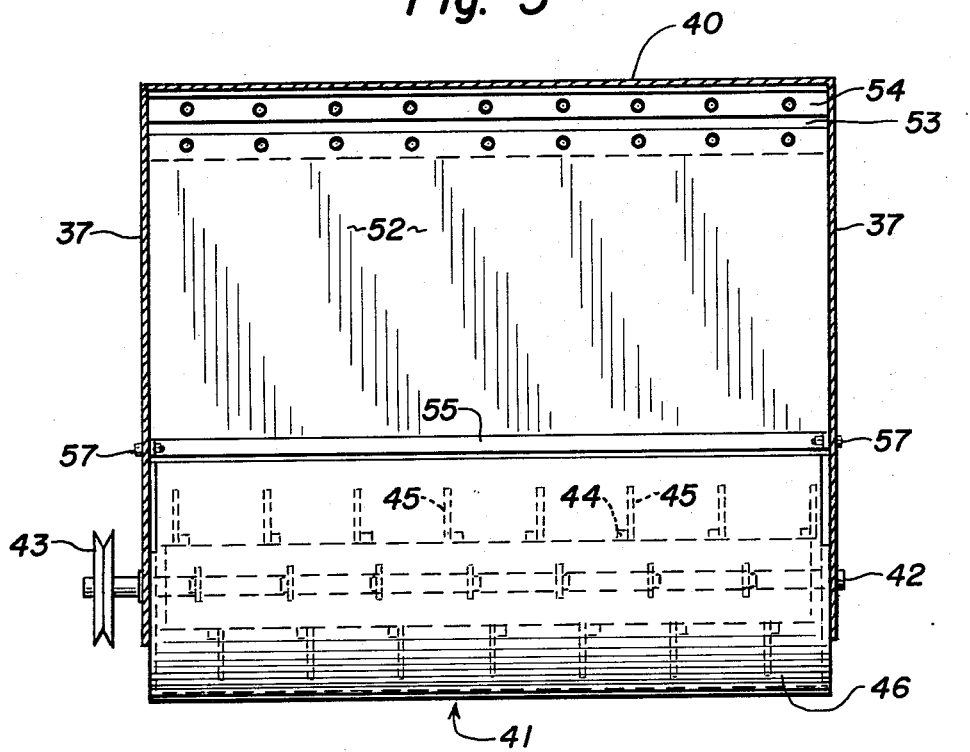
FIG. 3 is an end elevational view of the straw discharge hood as taken along line 3—3 of FIG. 2.

As viewed in FIGS. 1 and 2, the panel 52 is swingable in a fore-and-aft direction, within the hood 18, between a first, rearward position and second, forward position. When the panel 52 is in its first position, as represented in solid line form in FIG. 1 and broken line form in FIG. 2, the emanating residue material is directed downwardly toward the inlet opening 47 of the straw chopper 41; however, when the panel 52 is moved or swung forwardly to its second position, as represented in broken line form in FIG. 1 and solid line form in FIG. 2, the path of the emanating material is changed and is blocked from the straw chopper 41. In this second position, the emanating material strikes the panel 52 and is deflected forwardly of the straw chopper 41 and discharged through the residue outlet 20 onto the ground.

Further, a simple fastening means has been provided to retain the panel 52 in either of its first or second positions. Secured to the front surface of the panel 52, adjacent the lower marginal edge and extending across the width thereof, is a flat metal strap 55. Each end of the strap is provided with a forwardly projecting tab 56 which is disposed adjacent a respective sidewall 37. A pin 57 inserted through respective holes in the tabs 56 and corresponding holes in the sidewalls 37 retains the panel 52 in either of its desired first or second positions.

From the above description, it can be readily appreciated that the present invention sets forth a simple and inexpensive means which is very convenient for use by the operator to control the discharge path of residue material emanating from a combine. Thus, if the operator desires to treat the crop residue material, such as by chopping, he simply moves the deflector panel 52 to its first position and allows residue material to flow into the straw chopper 41. However, when the operator desires to collect and windrow the residue material, he simply swings the deflector panel 52 forwardly to its second position thereby blocking the emanating material from entering the straw chopper 41 and permitting it to be discharged through the residue outlet 20, forwardly of chopper 41, and onto the ground.

With this invention, an operator need not be burden with the time consuming and cumbersome task of attaching and detaching a crop residue treating device, such as a straw chopper or the like, on a combine as has been the custom of the past. Further, the present invention is very simple in structure, inexpensive and convenient to operator.

While the preferred structure in which the principles of the present invention have been incorporated, is shown and described above, it is to be understood that the invention is not limited to the particular details, as shown and described, but that, in fact, widely different means may be employed in the practice of the broader aspects of the invention.

Having thus described the invention, what is claimed is:

1. In a combine having a hollow residue receiving discharge hood provided with a downwardly facing residue outlet for receiving residue material emanating from said combine and a residue treating means, such as a straw chopper or the like, mounted in the vicinity of said outlet for treating said residue material and discharging the same onto the ground, the improvement comprising:
    a deflector mounted within said hood above said treating means and adapted to be disposed between a first position wherein said emanating residue material is deflected into said treating means and a second position wherein said emanating residue material is deflected through said residue outlet to thereby bypass said treating means; and
    means for mounting said deflector for movement between said first and second positions.

2. In a combine as defined in claim 1, wherein said deflector is a panel with the upper edge of the panel being pivotally mounted on an upper surface of said discharge hood such that the lower edge of said panel travels in an arcuate path as said panel is moved between its first and second positions.

3. In a combine as defined in claim 2, wherein:
    said discharge hood includes a pair of longitudinally extending space-apart sidewalls joined by a top wall and a rear wall;
    said panel is a rigid member extending laterally between said sidewalls, upwardly to said top wall and downwardly to a position above said treating means.

4. In a combine as defined in claim 3, further comprising fastening means for retaining said panel in said first and second positions.

5. In a combine as defined in claim 1, wherein said deflector is an upright panel which extends transversely between the sidewalls of said hood and has its upper end pivotally mounted within and to said hood and its lower end extending above said treating means.

6. In a combine as defined in claim 1, wherein the deflector is generally vertical in one of its first and second positions and is generally inclined in the other one of its first and second positions.

7. In a combine as defined in claim 6, wherein the deflector is upwardly and forwardly inclined in said first position.

8. In a combine as defined in claim 1, wherein:
    said treating means is mounted within the vicinity of the rearmost portion of the outlet of said discharge hood; and
    said deflector is pivotally mounted at its upper end to an upper portion of said discharge hood and is forwardly inclined in its first position to deflect the emanating residue material into said treating means and is generally vertically disposed in its second position to deflect the emanating residue material forwardly of said treating means and through said outlet.

* * * * *